United States Patent [19]

Abblard et al.

[11] 3,873,557

[45] Mar. 25, 1975

[54] PROCESS FOR HYDROXY-METHYLATION OF A SUBSTITUTED 3-HYDROXY-PYRIDINE

[75] Inventors: Jean Abblard, Caluire & Cuire; Rene Viricel, Lyon, both of France

[73] Assignee: PEPRO, Societe pour le Developpement et la Vente de Specialites Chimiques, Lyon, France

[22] Filed: Feb. 27, 1973

[21] Appl. No.: 336,187

[30] Foreign Application Priority Data
Mar. 1, 1972  France .............................. 72.07772

[52] U.S. Cl. ... 260/297 R, 260/295.5 R, 260/296 R
[51] Int. Cl. .......................................... C07D 31/28
[58] Field of Search ................................ 260/297 R

[56] References Cited
OTHER PUBLICATIONS

Roberts et al., Basic Principles of Organic Chemistry, Benjamin Publishers, Page 806, (1965), QD 251 R58C.6.

Urbanski, J. Chem. Soc., London, pages 132–134, (1947), QDI C.6.

*Primary Examiner*—Alan L. Rotman
*Attorney, Agent, or Firm*—Browdy and Neimark

[57]  ABSTRACT

Process for the hydroxymethylation in the 2-position of a 3-hydroxypyridine substituted in the 6-position by the combined action of formaldehyde and one amine wherein the amine used is a tertiary amine. Namely when 3-hydroxy 6-methylpyridine is involved, 0.2 to 1 mol of triethylamine per mol of formaldehyde is used and the reaction is carried out at a temperature from about 50° to 100°C.

8 Claims, No Drawings

PROCESS FOR HYDROXY-METHYLATION OF A SUBSTITUTED 3-HYDROXY-PYRIDINE

This invention relates to a process for the production of a 2-hydroxymethyl-3-hydroxy pyridine substituted in the 6-position from the corresponding 3-hydroxypyridine substituted in the 6-position.

2-hydroxymethyl-3-hydroxy pyridines optionally substituted in the 6-position are important intermediate compounds for syntheses, more particularly for the production of cyclic phosphoric esters such as those described in Application Ser. No. 297,316 of Oct. 13, 1972, which are insecticide.

There are several processes for synthesising 2-hydroxymethyl-3-hydroxy 6-methylpyridine in particular.

According to Urbansky (Journal of Chemical Society, 1947, page 132), it is known that 3-hydroxy-6-methyl pyridine in solution in 10 percent sodium hydroxide can be reacted with an aqueous solution of formaldehyde.

The yields of crude product are relatively high (about 75 percent) but unfortunately this product is poor in quality so that, if it is desired to obtain a product of satisfactory purity, the yield is reduced by about half.

Accordingly, this process which gives a generally highly impure product in uncertain yields has never been worked on an industrial scale, although it only involves a single phase.

It has also been proposed to use Mannich's reaction, based on the combined action of formol and dimethylamine, to form a compound known as 2-dimethylamino methyl-3-hydroxy-6-methyl pyridine (compound I) in accordance with the following scheme:

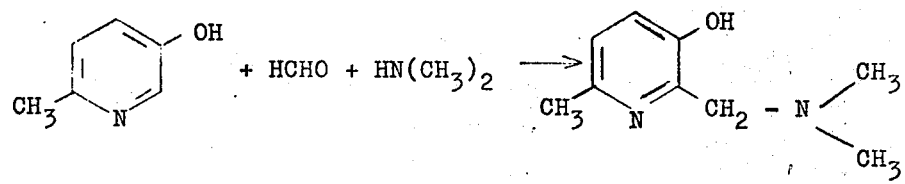

(I)

In a second stage, compound (I) is reacted with acetic anhydride to form an acetic diester in accordance with the following scheme:

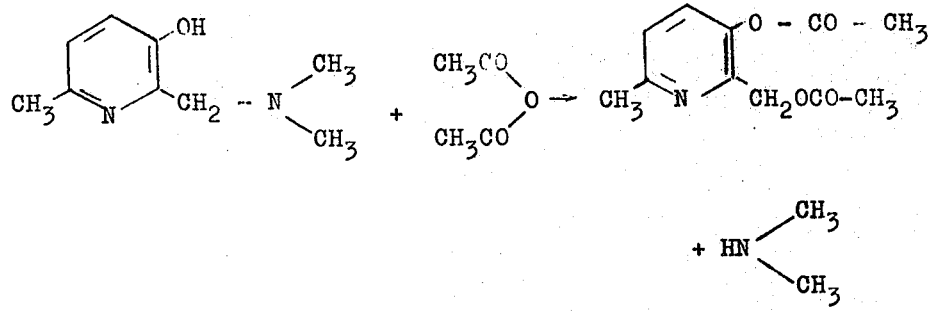

Finally, the end product is obtained by saponifying the diacetate with potassium hydroxide in accordance with the following scheme:

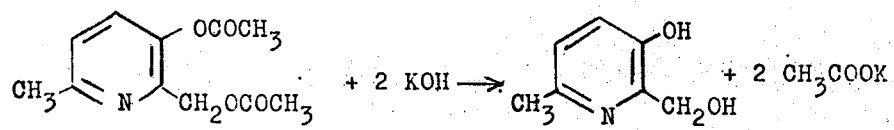

Each of these stages gives a very good yield (75 to 100 percent), with the result that the total yield is of the order of 60 to 70 percent. In addition, the first reaction has the advantage of not forming any secondary products.

However, the need for three stages is a disadvantage from the industrial point of view, especially since, at the end of each of the first two stages, distillation has to be carried out under a powerful vacuum to obtain the pure product.

The object of the present invention is to provide a simple, economic, high-yield and, hence, industrially workable process for the production of a 2-hydroxymethyl-3-hydroxy pyridine substituted in the 6-position.

Accordingly, the invention relates to a process for the hydroxymethylation in the 2-position of a 3-hydroxy pyridine substituted in the 6-position by the simultaneous action of formaldehyde and an amine, distinguished by the fact that this amine is a tertiary amine.

The following scheme can be proposed for this reaction, although it has not been determined with any degree of certainty: in a first stage, a quaternary ammonium salt of the addition product is formed:

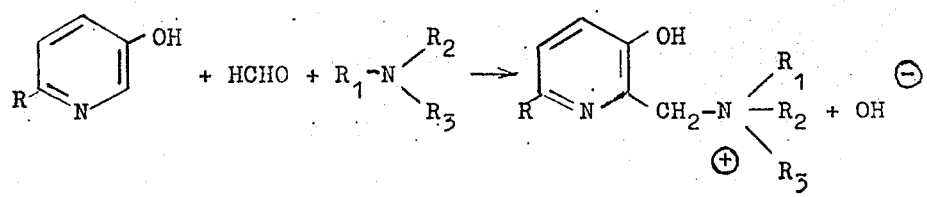

decomposing immediately afterwards with regeneration of the tertiary amine in accordance with the following reaction:

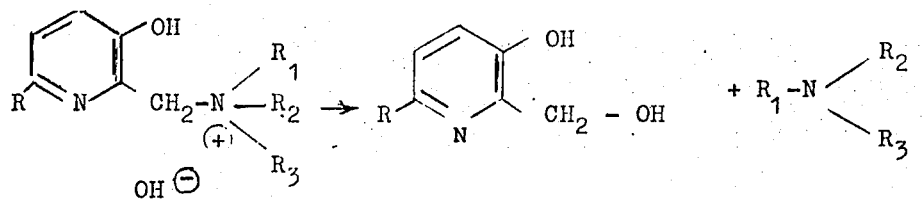

In contrast to Mannich's reaction carried out with a secondary amine, the tertiary amine and the formol do not have to be present in equimolecular quantities, because it has surprisingly been found that a quantity of tertiary amine corresponding to 0.5 mol or even less per mol of formol enables excellent yields to be obtained. Generally, the quantity used is between 0.2 mol and 1 mol of tertiary amine per mol of formol.

In the context of the invention, 3-hydroxy pyridine substituted in the 6-position is primarily understood to be a 3-hydroxy pyridine substituted in the 6-position by an alkyl radical containing from 1 to 4 carbon atoms, the nucleus also optionally being substituted in at least one of the 4 or 5-positions by an alkyl radical such as defined above. In addition, the hydrogen atom of the hydroxy radical can be substituted by an alkyl radical or carboxy alkyl radical containing 1 to 4 carbon atoms.

In other words, the starting materials of the present invention constitute 6-alkyl pyridines of the formula

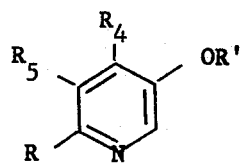

wherein R is an alkyl of 1-4 carbons, $R_4$ is hydrogen or an alkyl of 1-4 carbons, $R_5$ is hydrogen or an alkyl of 1-4 carbons, and R' is hydrogen, an alkyl of 1-4 carbons or carboxy alkyl of 1-4 carbons.

Although the rest of the specification relates more particularly to 3-hydroxy-6-methyl pyridine, hereinafter referred to as HMP, the invention also relates to the hydroxy methylation in the 2-position of related products such as those defined above.

The process uses formaldehyde which can be in the commercial form of an approximately 35 percent aueous solution. It is also possible to use products which liberate formaldehyde in situ, such as for example its oligomers or hexamethylene tetramine.

The tertiary amine used in accordance with the invention can be aliphatic, preference being given to an amine of the following formula

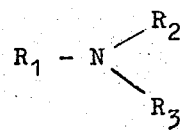

in which $R_1$, $R_2$ and $R_3$ are identical or different alkyl radicals containing 1 to 3 carbon atoms, especially the methyl and ethyl radicals.

Triethylamine is one example of a particularly suitable tertiary amine. It is liquid under the reaction conditions and is referred to hereinafter as TEA.

The tertiary amine can be added to the reaction medium in anhydrous form, in aqueous solution in the case of aliphatic amines with a lower alkyl radical, or in the form of a quaternary ammonium salt.

The mixture of 3-hydroxy pyridine substituted in the 6-position, formaldehyde and tertiary amine is heated to a moderate temperature, generally lower than about 100°C and, preferably, between about 50° and 100°C, an excessively high temperature giving rise to the formation of, in particular, condensation products of formaldehyde. The temperature can be artificially maintained, although it can also be maintained by self-regulation by virtue either of the low boiling point of the amine or of an azeotrope based on the amine. This is particularly the case where TEA is used in aqueous medium, the TEA-water azeotrope having a boiling point of from 74° to 76°C.

The reaction on which the process according to the invention is based is facilitated when the product obtained, generally substantially insoluble, is solubilised by the tertiary amine. This is particularly the case when TEA is used.

The process according to the invention for producing 2-hydroxymethyl-3-hydroxy-6-methyl pyridine has the advantage of being a high-yield process which regularly gives yields of as high as around 100 percent. As already mentioned, yields of this kind have already been obtained for a molar TEA/HMP ratio of less than 0.5.

The process according to the invention is further distinguished by the quality of the products obtained.

The invention is illustrated by but by no means limited to the following Examples.

EXAMPLE 1

1090 g (10 mols) of HMP, 300 g (10 mols) of a 38 percent aqueous formaldehyde solution and 1010 g (10 mols) of TEA are mixed with 2 litres of water. The mixture is heated, the HMP dissolving in the TEA from about 50°C. The mixture is at reflux when the temperature reaches 74°C. Heating, self-regulated to this temperature, is maintained for 6.5 hours, accompanied by stirring.

The liquid is then concentrated under reduced pressure until its volume decreases by half. At this moment, the product crystallizes. The mixture is cooled for 2 hours to 0°C, after which the product obtained is dried.

The mother liquors are then concentrated under reduced pressure. The residue is taken up in hot acetone, filtered and cooled. A second fraction of product is thus collected.

A product corresponding to 2-hydroxymethyl-3-hydroxy-6-methyl pyridine, as shown by the following Table, is thus obtained in a total yield of 1181 g, corresponding to a yield of 85 percent, m.p. 152°C:

|  | C | N | O | H |
|---|---|---|---|---|
| calculated | 60.43 | 10.07 | 23.03 | 6.47 |
| found | 60.45 | 10.05 | 23.04 | 6.46 |

The product obtained is remarkable in its purity insofar as the crude product has a melting point of 152°C whereas the recrystallised product melts at 154°C.

EXAMPLE 2

The procedure is as in Example 1, using 170 mols of TEA, HMP and formol. The reaction takes place extremely satisfactorily and gives a product of high purity (melting point 154°C) in a yield of 86.5 percent.

EXAMPLE 3

The procedure is as in Example 1, except that the quantity of TEA is 0.5 mol instead of 1 mol per mol of HMP.

Although the yield is substantially the same, the product is less pure because its melting point is between 149° and 150°C. This test tends to demonstrate that the triethylamine acts as a homogeneous catalyst owing to the effect which it has in quantities very much smaller than those of an equimolecular reaction.

EXAMPLE 4

The procedure is as in Example 1, except that the TEA is used in a quantity of 0.25 mol instead of 1 mol per mol of HMP.

Although slightly lower, the yield at 76 percent remains high, whilst the reaction gives a product melting at 150° to 151°C, i.e. a product comparable in purity to the product of Example 3.

EXAMPLE 5

The procedure is as in Example 1, except that it is carried out with respective quantities of reactant corresponding to 1 mol in 200 ml of water in the presence and absence of TEA under the conditions shown in the following Table:

| Test | Quantity of TEA in mols | Reaction temperature reflux | Yield in % | Melting point |
|---|---|---|---|---|
| A | 0 | 85°C | 0 | — |
| B | 0 | 98°C | 39 | 149°C |
| C | 1 | 74°C | 98 | 150°C |

Tests A and B show that, in the absence of TEA, the reaction mixture has to be heated to almost 100°C to obtain the hydroxymethyl derivative in a limited yield (abundant formation of red oily residues). Thus, although the starting reactant is a pyridine, self-catalysis does not occur which can be explained by the fact that the HMP is not sufficiently basic.

By contrast, in the presence of TEA, a substantially quantitative yield of a product of better quality is obtained at a temperature distinctly lower than that of test A in which the reaction did not take place despite heating for 24 hours.

EXAMPLE 6

Hydroxy methylation in the 2-position of the same quantity of HMP is carried out with an equimolecular quantity of formaldehyde by two different methods: on the one hand by the sodium hydroxide process described by Urbansky (U) referred to earlier on at two different temperatures, on the other hand in accordance with the invention, cf. test C of the preceding Example.

The test conditions and results of the preceding Example are set out in the following Table:

| Test | Temperature °C | Yield % |
|---|---|---|
| $U_1$ | 70 | 25 |
| $U_2$ | 100 | 50 |
| C | 74 | 98 |

It can be seen from this Table that, at 70°C, Urbansky's reaction is highly incomplete although the HMP is used in dissolved form and that, at 100°C, the yield remains limited, whereas according to the invention the reaction produces a substantially quantitative yield at 74°C. These examples clearly demonstrate the advantages arising out of the use of a tertiary amine, especially triethylamine, namely a reaction a. in solution due to the solubilisation of the HMP by TEA b. at a moderate temperature, avoiding the formation of secondary products, c. in a single, uncomplicated and brief operation, d. with yields in excess of 80 percent e. giving extremely pure products.

These results are entirely unexpected because although Urbansky's method using sodium hydroxide is carried out in a single operation, it has to be carried out an elevated temperature with uncertain yields to obtain a product of industrially unacceptable purity, the method based on Mannich's reaction using a secondary amine involves not one, but three operations excluding the distillations carried out under a powerful vacuum after the first two stages.

We claim:

1. A process for the hydroxy-methylation in the 2-position of a 6-alkyl pyridine of the formula

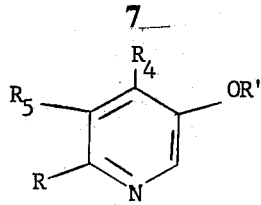

wherein R is an alkyl of 1–4 carbons, $R_4$ is hydrogen or an alkyl of 1–4 carbons, $R_5$ is hydrogen and R' is hydrogen; or when $R_4$ is hydrogen, R' is hydrogen, an alkyl of 1–4 carbons or carboxy alkyl of 1–4 carbons, said process comprising reacting said 6-alkyl pyridine with formaldehyde in the presence of a tertiary amine of the formula

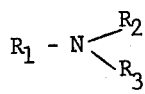

wherein $R_1$, $R_2$ and $R_3$ are alkyls of 1–3 carbons, to produce a 2-hydroxy methyl, 6-alkyl pyridine of the formula

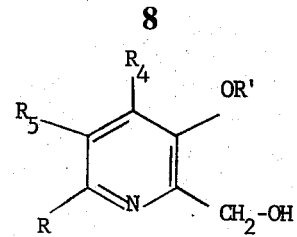

2. A process in accordance with claim 1 wherein R', $R_4$ and $R_5$ are all hydrogen.

3. A process as claimed in claim 1, wherein the tertiary amine is triethylamine.

4. A process as claimed in claim 1, wherein the tertiary amine is present in a quantity of from 0.2 to 1 mol per mol of formaldehyde.

5. A process as claimed in claim 1, wherein the 3-hydroxy pyridine substituted in the 6-position is 3-hydroxy-6-methyl pyridine.

6. A process as claimed in claim 3, wherein the reaction is carried out at a temperature of from about 50° to 100°C.

7. A process as claimed in claim 6 wherein the tertiary amine is present in a quantity of from 0.2 to 1 mol per mol of formaldehyde.

8. A process as claimed in claim 7 wherein the 3-hydroxy pyridine substituted in the 6-position is 3-hydroxy-6-methyl pyridine.

* * * * *